(12) United States Patent
Kimura

(10) Patent No.: US 8,964,517 B2
(45) Date of Patent: Feb. 24, 2015

(54) OPTICAL APPARATUS

(75) Inventor: Shigeharu Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 573 days.

(21) Appl. No.: 13/344,623

(22) Filed: Jan. 6, 2012

(65) Prior Publication Data

US 2012/0188358 A1    Jul. 26, 2012

(30) Foreign Application Priority Data

Jan. 20, 2011  (JP) ................................ 2011-009361

(51) Int. Cl.
| | | |
|---|---|---|
| G11B 7/26 | (2006.01) | |
| G11B 7/00 | (2006.01) | |
| G02B 21/00 | (2006.01) | |
| G02B 27/28 | (2006.01) | |
| G11B 7/1353 | (2012.01) | |
| G11B 7/1395 | (2012.01) | |

(52) U.S. Cl.
CPC .......... *G02B 21/0092* (2013.01); *G02B 27/283* (2013.01); *G11B 7/1353* (2013.01); *G11B 7/1395* (2013.01)
USPC ...................... 369/103; 369/44.11; 369/13.29; 369/13.3; 369/110.02; 369/112.16; 369/112.17; 369/112.22; 359/24

(58) Field of Classification Search
None
See application file for complete search history.

(56) References Cited

U.S. PATENT DOCUMENTS 5,218,586 A * 6/1993 Tadokoro ................... 369/44.14
5,490,129 A * 2/1996 Matsuoka et al. ............ 369/120

OTHER PUBLICATIONS

C. J. R. Sheppard et al., Image formation in the scanning microscope, Optical Acta 1997, pp. 1051-1073, vol. 24, No. 10.
Kai Wicker et al., Interferometric resolution improvement for confocal microscopes, Optics Express, Sep. 17, 2007, pp. 12206-12216, vol. 15, No. 19.

* cited by examiner

*Primary Examiner* — Wayne Young
*Assistant Examiner* — Dionne Pendleton
(74) *Attorney, Agent, or Firm* — Antonelli, Terry, Stout & Kraus, LLP.

(57) ABSTRACT

An optical system capable of obtaining a high-resolution image using interference and thus capable of providing a stable signal is realized. A particular polarization state of response light emitted from an object is selected, and light in the selected particular polarization state is split into two beams. The split two beams are polarized into two different polarization states. After one of the two beams is subjected to an image inversion, the two beams are condensed such that they interfere with each other. The interfering light is split into a plurality of beams, and each of these beams is detected after they are passed through different polarizing filters. Detected signals are combined together and processed to obtain high-stability amplitude information without being influenced by a phase difference between the two beams.

10 Claims, 11 Drawing Sheets

OPTICAL APPARATUS

CLAIM OF PRIORITY

The present application claims priority from Japanese patent application JP 2011-009361 filed on Jan. 20, 2011, the content of which is hereby incorporated by reference into this application.

FIELD OF THE INVENTION

The present invention relates to an optical apparatus having optical resolving power.

BACKGROUND OF THE INVENTION

A confocal scanning microscope is known as a technique to increase resolving power of an optical microscope (see for example, C. J. R. Sheppard and A. Choudhury, "Image Formation in the Scanning Microscope," Opt. Acta, Vol. 24, 1051-1073 (1977)). An optical system thereof may be of a reflection type or a transmission type. In a following description, for ease of understanding, it is assumed that the optical system is of the transmission type. FIG. 3 is a schematic diagram of a transmission-type optical system. Light emitted from a light source 101 illuminates a pinhole 205. As a result, a point light source is obtained. In practice, the pinhole has a finite size, and thus the obtained point light source is an approximation to an ideal pinhole. Light emerging from the pinhole is focused by an objective lens 201 onto an object 202 under observation. The object 202 under observation can be three-dimensionally scanned using a scanning mechanism 102 such as a voice coil. After passing through the object under observation, the light further passes through an objective lens 203, which focuses the light onto a pinhole 204. The light passing through the pinhole 204 is detected by a photodetector 103, which outputs a signal corresponding to the incident light. The output signal from the photodetector 103 is displayed on a display apparatus 104 such that an image of the object under observation corresponding to a scanning position is displayed. It is known that resolving power in a lateral direction of the confocal scanning microscope depends on the pinhole 204. The resolving power can be increased by reducing the pinhole size. Conversely, if the pinhole size is increased, the result is degradation in the resolving power, and the resolving power can become similar to that of a non-scanning-type optical microscope configured such that a large area of an object under observation is illuminated and reflected light from the object under observation is passed through an objective lens to form an image of the object under observation. FIG. 4 illustrates a point spread function obtained in a confocal scanning microscope with a pinhole with a minimized size and also illustrates a point spread function obtained in an optical microscope of a non-scanning type. A horizontal axis v is expressed in normalized optical units. More specifically, v is defined as $v=2\pi \times x \times NA/\lambda$. In this definition, NA denotes the numerical aperture of the objective lens 201 and the 203. Note that it is assumed that both lenses have equal NA. In the definition, x denotes a coordinate in a direction (a lateral direction) perpendicular to an optical axis, and $\lambda$ denotes a wavelength of light. As can be seen from FIG. 4, the point spread function 131 of the confocal scanning optical microscope is narrower than the point spread function 130 of the non-scanning-type optical microscope, which means that the confocal scanning optical microscope provides higher resolving power.

It is possible to increase the resolving power of the confocal scanning optical microscope by reducing the pinhole size as described above. However, the reduction in the pinhole size results in a reduction in intensity of light to be detected, and thus degradation in signal-to-noise ratio occurs. One technique to deal with the above problem is to use an optical interference effect as disclosed, for example, in K. Wicker and R. Heintzmann, "Interferometric Resolution Improvement for Confocal Microscopes," Optics Express, Vol. 15, No. 19, 12206-12216 (2007). FIG. 5 schematically illustrates an optical system configured according to this technique. Laser light emitted from a laser light source 101 is converted into collimated light by a collimator lens 206 and then reflected by a beam splitter 207 The reflected laser light is incident on an objective lens 201. The objective lens 201 focuses the laser light onto an object 202 under observation which can be scanned by a scanning mechanism 102. Laser light reflected by the object 202 under observation returns to the objective lens 201 and passes through the beam splitter 207. After passing through the beam splitter 207, the laser light is split by a beam splitter 208 into two laser beams. One of the two laser beams passes through the beam splitter 208 and is reflected by a reflecting mirror 211. This laser beam passes through a phase retarder 212 and is then incident on a beam splitter 213. On the other hand, the other one of the two laser beams is reflected by the beam splitter 208 and passes through two convex lenses 209 and 210. When the laser beam passes through the two convex lenses 209 and 210, an image of the beam is inverted with respect to the optical axis thereof. The laser beam is then reflected by a reflecting mirror 216 and is incident on the beam splitter 213.

Thus, the beam splitter 213 receives the two laser beams 251 and 252 which are incident from two directions. Each of the two laser beams 251 and 252 is split by the beam splitter 213 into reflected light and transmitted light. Thus, interfering light emerges in two directions, and these light beams are focused by condensing lenses 214 and 215 onto detectors 105 and 106, respectively. Pinholes 217 and 218 are disposed on the respective detectors 105 and 106 to limit detection areas thereof. Let $\theta_1$ denote the phase of the laser beam 252 passing through the beam splitter 213, $\theta_2$ denote the phase of the laser beam 252 reflected by the beam splitter 213, $\phi_1$ denote the phase of the transmitted laser beam 251, and $\phi_2$ denote the phase of the reflected laser beam 251. Note that these phases have a relation $\theta_2 - \phi_1 = \theta_1 - \phi_2 + \pi$. If there is no phase difference between laser beams 251 and 252, and if the phases are denoted by 0° ($\theta_1 = \phi_1 = 0$), it is possible to achieve $\theta_2 = \pi$ and $\phi_2 = 0$ by properly selecting the material of the beam splitter 213. In this state, it is possible to adjust the phase retarder 212 such that one of the interfering laser beams incident on the respective photodetectors 105 and 106 is in a constructive state and the other one is in a disconstructive state. By determining the difference between these two interfering laser beams, it is possible to obtain only an interfering light component, and it is possible to achieve a high-resolution image using a signal of the interfering light component. In this technique, the pinhole size is not so small as that of the confocal scanning microscope, a significant reduction in the light intensity occurs, which is a benefit provided by this technique.

SUMMARY OF THE INVENTION

In the technique shown in FIG. 5, two laser beams interfere with each other and an interference signal is obtained. In interference optical systems, in general, if a fluctuation occurs in the air in an optical path, the fluctuation can cause a phase difference to occur between two light beams, and thus a change in interfering state can occur. When it is desired to reduce the size of the optical system, it is necessary to dispose a light source, which generates heat, at a location close to other optical elements. This causes the optical elements to be easily affected by the heat, which can cause a change in interfering state. Such a change in interfering state makes it difficult to obtain a stable signal. Therefore, in the optical system shown in FIG. 5, as with other optical systems using interference, it is very difficult to maintain a difference in the optical path length such that the interfering light beams incident on the two detectors are maintained in the constructive and disconstructive states, respectively. In other words, the constructive state and the disconstructive state of the light beams can change during the observation of the image, which makes it difficult to perform a high-accuracy observation.

In view of the above, the present invention provides an optical system in which two light beams in different polarization states interfere with each other such that the amplitude information is separated.

In an aspect, the present invention provides an optical apparatus including a condensing optical system configured to condense light onto an object, a splitting optical system configured to split response light, such as reflected light from the object, light transmitted through the object, or fluorescence light from the object, into two light beams, a polarizing optical element configured to polarize the two split beams of response light into different polarization states, an image-inverting optical system disposed in an optical path of one of the two split beams of response light, an element configured to superimpose the two beams of response light, an optical element configured to split the superimposed response light into a plurality of beams, different polarizing filters disposed in optical paths of the respective split beams of combined response light, detectors configured to detect the respective split beams of combined response light, and an electronic circuit configured to calculate amplitude information or/and phase information by processing signals supplied from the respective detectors.

Thus, the present invention makes it possible to prevent the optical system from being influenced by a change in phase difference between the two optical paths of interfering light beams even when a change in phase difference occurs due to a change in optical path length caused by heat or the like or due to a change in refractive index caused by a fluctuation of the air, and thus it becomes possible to obtain a high-resolution and high-stability output signal.

DETAILED DESCRIPTION OF THE PREFERRED EMBODIMENTS

The present invention is described in further detail below with reference to preferred embodiments in conjunction with the accompanying drawings.

First Embodiment

Figure 1:
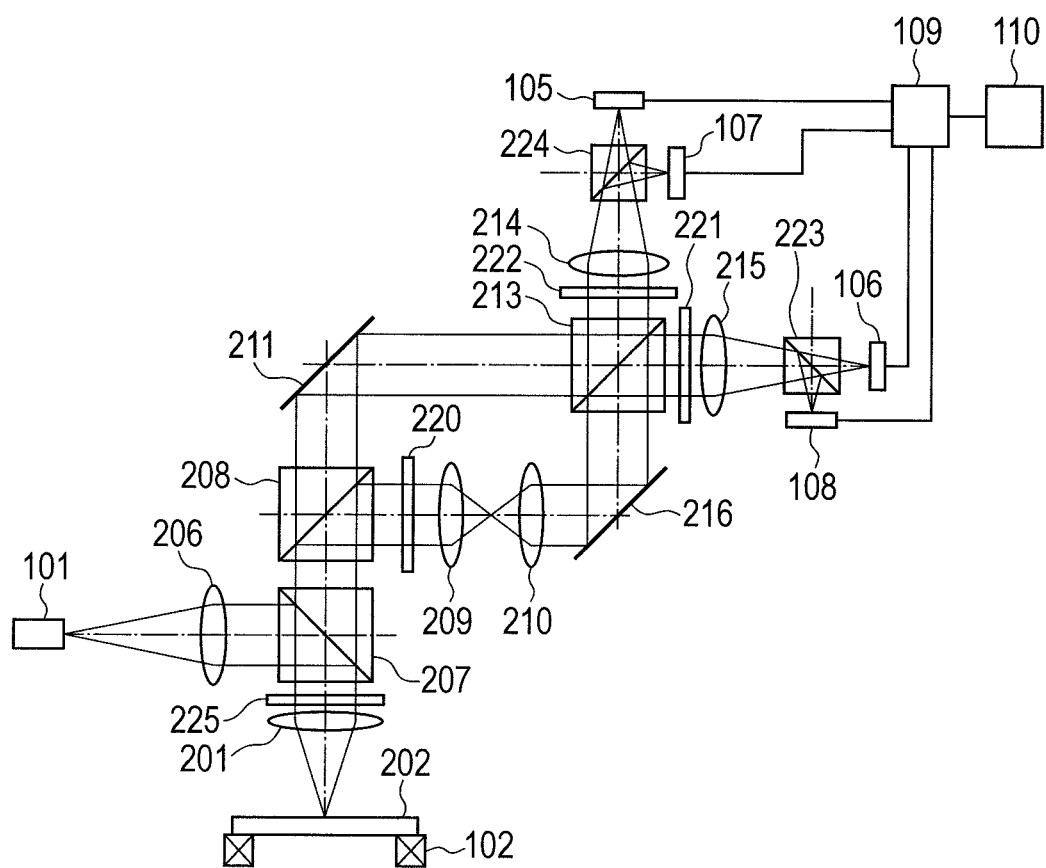
FIG. 1 is a diagram illustrating an example of an optical system according to an embodiment of the present invention.

FIG. 1 shows a scanning optical microscope including an optical system according to an embodiment of the present invention. A laser light source 101 emits s-polarized light, which is converted into parallel light by a collimator lens 206. The laser light source 101 may be configured to emit light with a coherence length of about 5 mm or greater so that interference can easily occur regardless of a difference of an optical path length. This makes it unnecessary to adjust the optical path length. If the coherence length of light emitted from the laser light source used is short, it is necessary to use a phase retarder or the like. A polarizing beam splitter 207 reflects an s-polarized light component and transmits a p-polarized light component. Because the light source 101 emits s-polarized light, the light emitted from the light source 101 is reflected by the beam splitter 207 and then converted into circular polarized light by a quarter wavelength plate 225. Thereafter, the light is focused by an objective lens 201 onto an object 202 under observation. The object under observation can be scanned using a scanning mechanism 102. In the present embodiment, to simplify the optical system, the object under observation itself is scanned. However, the scanning method is not limited to that employed in the present embodiment, but the scanning may be performed in other ways. For example, a focused spot may be scanned. Furthermore, it is assumed by way of example that the microscope is configured such that light reflected from an object under observation is detected, although the microscope may be configured such that light passing through the object under observation is detected. The reflected light from the object under observation returns to the objective lens 201 and further passes through the quarter wavelength plate 225. When the light passes through the quarter wavelength plate 225, the light is converted into p-polarized light. The p-polarized light then passes through the beam splitter 207. Thereafter, the p-polarized light is split into two beams by a half beam splitter 208.

Of the two light beams, a light beam reflected by the half beam splitter 208 is converted into p-polarized light by a half wavelength plate 220 with a 45°-tilted optical axis. Thereafter, when the light beam passes through two convex lenses 209 and 210 with the same focal length, an image is inverted. The light beam is then reflected by a reflecting mirror 216 and is incident on a half beam splitter 213. On the other hand, of the two light beams described above, the other light beam passing through the half beam splitter 208 is reflected by the reflecting mirror 211 and is then incident on the half beam splitter 213 while maintaining the s-polarized state. Thus, two light beams polarized in different directions are incident from two directions on the half beam splitter 213, and each of these two light beams is split in two directions. Thus, interfering light is emitted in the two directions. An interfering light beam emitted to the right of the half beam splitter 213 as seen in FIG. 1 passes through a half wavelength plate 221 with a 22.5°-tilted optical axis and is then focused by a condensing lens 215 onto a detector located at the focal position of the condensing lens 215. A polarizing beam splitter 223 is disposed in the optical path and in front of the detector whereby the light beam is split into s-polarized and p-polarized components, which are then detected by a detector 106 and a detector 108, respectively. Let it be assumed that the object under observation is a point object located on the optical axis. Let A denote the complex amplitude of the reflected light from the object under observation, and let Ic denote a differential signal from the detector 106 and the detector 108, i.e., a signal indicating the difference between outputs from the detector 106 and the detector 108, then Ic can be expressed as follows:

$$Ic = \alpha |A|^2 \cos(\theta)$$

where $\alpha$ denotes a coefficient depending on a signal gain, detection efficiency of detectors, etc., and $\theta$ denotes a phase difference between two light beams that are obtained when the reflected light from the object under observation is split. On the other hand, the interfering light beam emitted from the half beam splitter 213 in an upper direction as seen in FIG. 1 passes through a quarter wavelength plate 222 with a 45°-tilted optical axis. After passing through the quarter wavelength plate 222, the interfering light beam is condensed by the condensing lens 214 and detected by detectors 105 and 107. Note that the interfering light beam condensed by the condensing lens 214 is split by a polarizing beam splitter 224 into s-polarized light and p-polarized light, which are then detected by the photodetectors 105 and 107, respectively. Let Is denote a differential signal output from the detectors 105 and 107, then Is can be expressed as follows.

$$Is = \alpha |A|^2 \sin(\theta)$$

Note that only interfering components are detected as Ic and Is. An operational apparatus 109 determines I according to an equation described below.

$$I = \sqrt{(Ic^2 + Is^2)} = \alpha |A|^2$$

Note that I obtained is a variable proportional to the intensity of the reflected light from the object under observation, and it depends only on the intensity of the reflected light from the object under observation regardless of the phase difference between the two beams. A display apparatus 110 displays an image of the object 202 under observation such that a particular scanning point of the object 202 under observation is displayed at a corresponding point on the display apparatus 110. In the present embodiment, signals output from four detectors are used. Alternatively, an interfered component may be calculated from signals output from three of the four detectors. In this case, the calculation may be performed using a computer such as a microcomputer.

When the magnification of the optical system is M, and when the object under observation in the form of a point object is located a distance "a" off the optical axis, two point-spread images symmetrical about the optical axis are formed at positions Ma apart from the optical axis on each of the four detectors. Note that the two point-spread images appear at symmetrical positions because the image is inverted by the two convex lenses 209 and 210. When an amplitude point-spread function with its center located at Mx of an ordinal-type optical system is expressed by A(Ma), and an amplitude point-spread function with its center located at −Ma is expressed by A(−Ma), an output signal I (a) is given as follows:

$$I(a) = \alpha |A(a)|^2 |\iint A(Ma)A(-Ma)dxdy|$$

Figure 6:
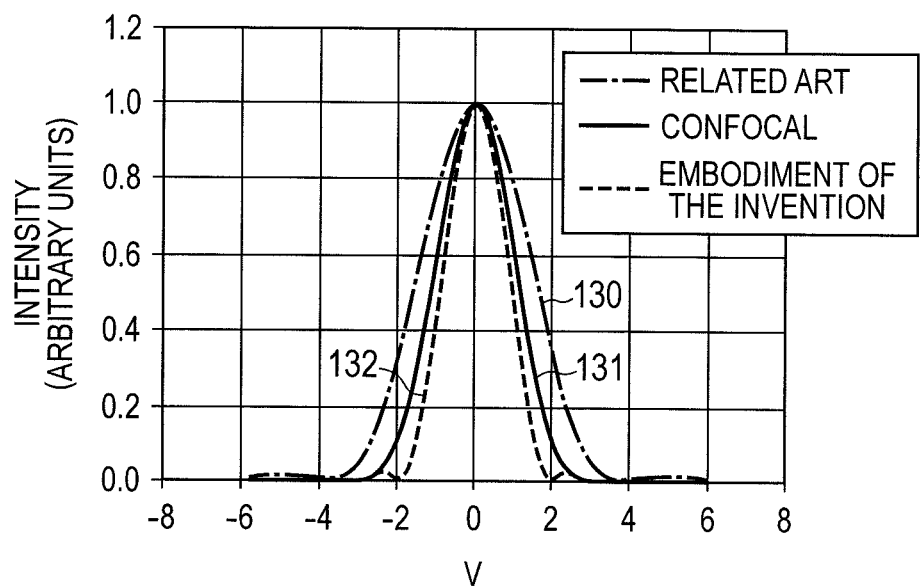
FIG. 6 is a diagram illustrating point spread functions obtained in a scanning optical microscope according to an embodiment of the present invention, an optical microscope of a widely used type, and a confocal scanning microscope.

Note that the surface integral in the above equation is taken over the detector. The surface integral leads to an increase in resolving power. FIG. 6 illustrates examples of point spread functions. In FIG. 6, a horizontal axis is expressed in normalized optical units. In this figure, reference numeral 130 indicates a point spread function $|A(v)|^2$ obtained when an ordinal-type optical system is used. A broken curve denoted by reference numeral 132 indicates a point spread function obtained when the optical system according to the present embodiment of the invention is used. As can be seen, the optical system according to the present embodiment of the invention can provide a small width in the point spread function, which means that the resolving power is better than achieved by a confocal scanning microscope (solid curve 131). Furthermore, in the present embodiment, unlike the confocal scanning microscope, no pinhole is disposed in front of each detector, and thus it is possible to avoid a significant reduction in light intensity, which makes it possible to obtain a signal with a high signal-to-noise ratio. Furthermore, the obtained signal does not include a phase difference component of interfering beams, and thus the signal is not influenced by the phase difference between the two beams, which means that a high-accuracy and high-stability image signal can be obtained without being influenced by a change in phase difference.

Second Embodiment

Figure 2:
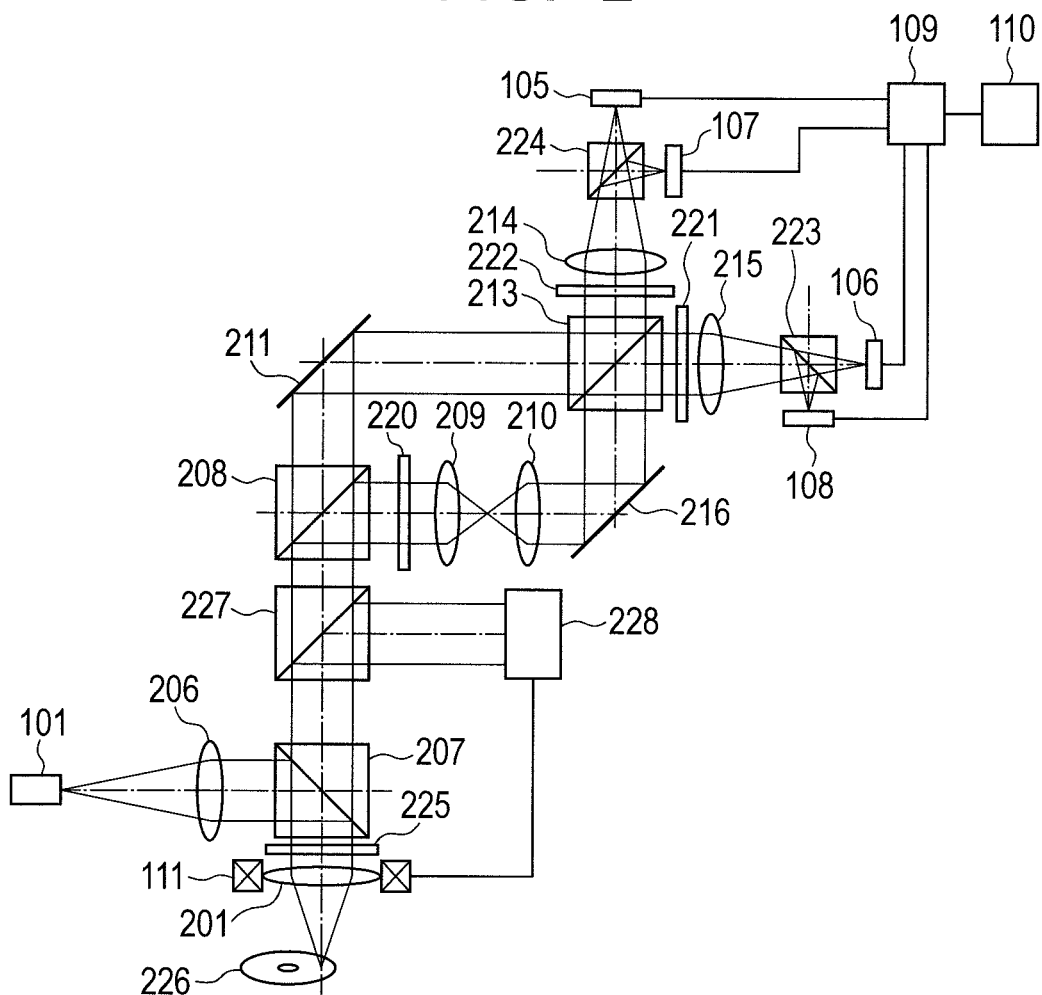
FIG. 2 is a diagram illustrating an example of an optical system of an optical pickup apparatus according to an embodiment of the present invention.
Figure 3:
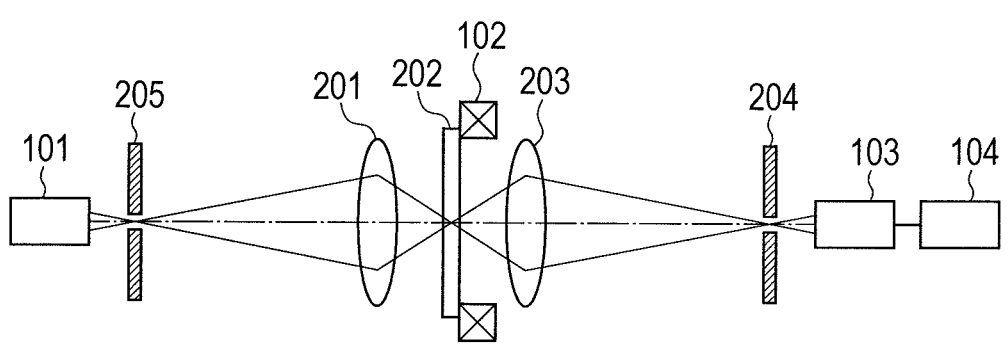
FIG. 3 is a diagram illustrating an example of an optical system of a transmission-type confocal scanning microscope.
Figure 4:
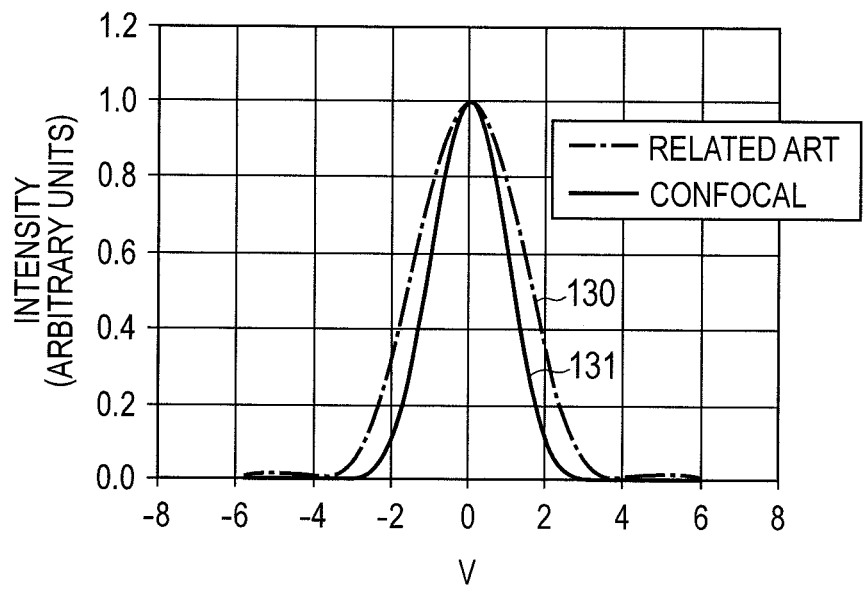
FIG. 4 is a diagram illustrating a point spread function of a confocal scanning microscope and that of an optical microscope of a related art.
Figure 5:
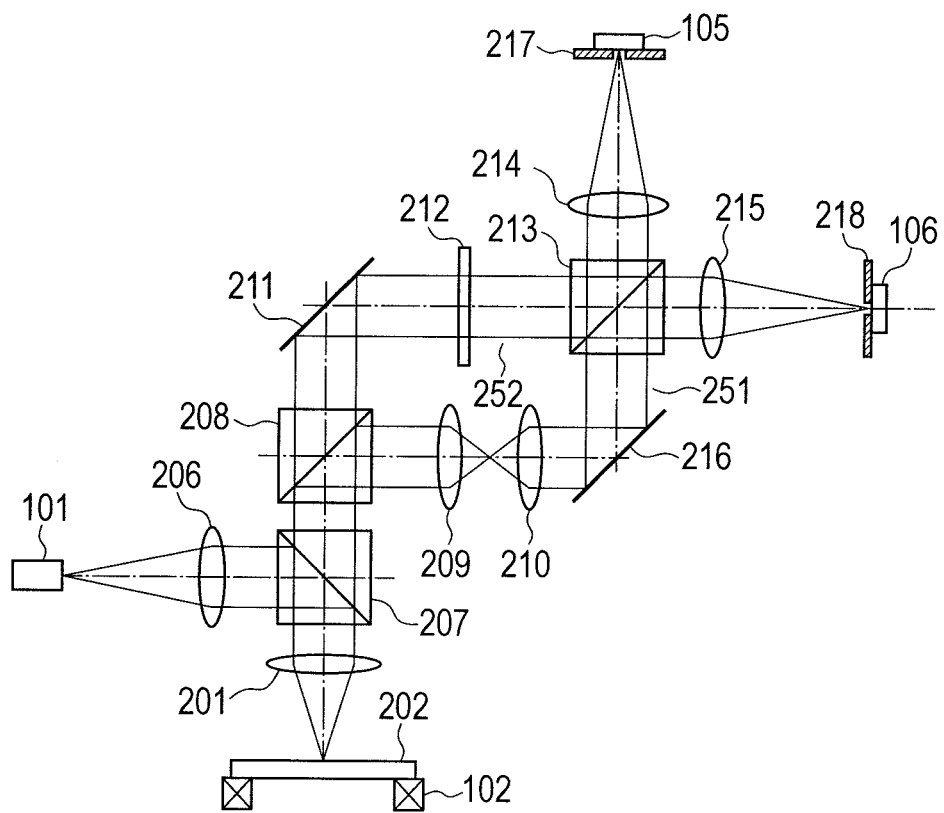
FIG. 5 is a diagram illustrating an optical system disclosed in K. Wicker and R. Heintzmann, "Interferometric Resolution Improvement for Confocal Microscopes," Optics Express, Vol. 15, No. 19, 12206-12216 (2007).
Figure 7:
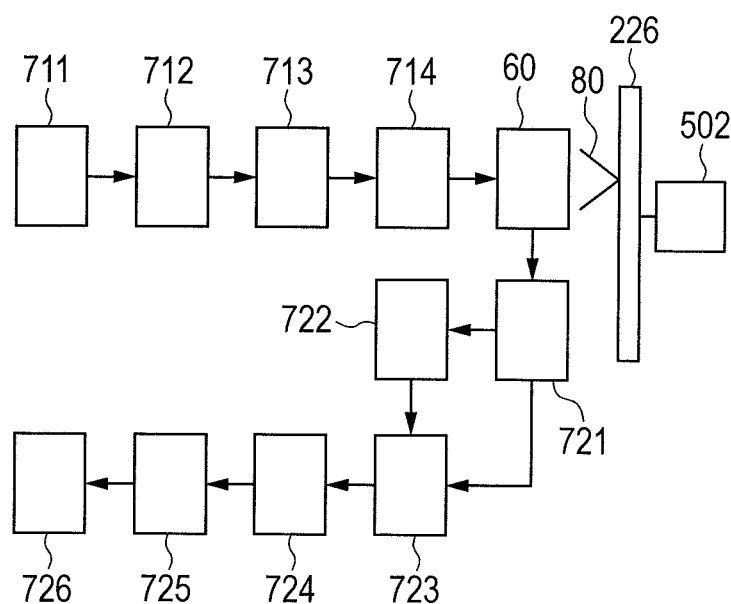
FIG. 7 is a diagram illustrating signal processing performed in an optical disk apparatus.

FIG. 2 illustrates a pickup optical system for use in an optical disk apparatus. This pickup optical system is achieved using an optical system according to an embodiment of the present invention. In FIG. 2, parts similar in function to those in FIG. 1 are denoted by similar reference numerals. After laser light emitted from a laser light source 101 is collimated, the laser light is condensed by an objective lens 201 onto an optical disk 226. The optical disk 226 is fixed to a rotating member such that the optical disk 226 is rotatable. Reflected light from the optical disk 226 travels to a half beam splitter 227 and is split into two beams by the half beam splitter 227. Of the two split light beams, one light beam travels passing through a beam splitter 208, and is finally used to generate a data signal. After being split by the beam splitter 208, the beams are processed in a similar manner as in the first embodiment described above with reference to FIG. 1, and a high-resolution signal is generated by an operational apparatus 109. The generated signal is processed by an electronic circuit 112. As a result, the data signal is obtained. With reference to FIG. 7, a brief description is given below as to the signal processing performed by the electronic circuit 112. Circuit blocks 711 to 714 are for recording data onto the optical disk 226. A block 60 is an optical system similar to the optical system excluding the electronic circuit 112 shown in FIG. 2. A block 711 is an error correction coding circuit that adds an error correction code to the data. A block 712 is a recording data encoding circuit that modulates the data according to a 1-7PP scheme. A block 713 is a recording compensation circuit that generates pulses depending on a mark length to be written. According to the generated pulse sequence, a semiconductor laser driving circuit 714 drives the laser light source 101 shown in FIG. 2 such that modulated laser light 80 is emitted via an objective lens. Using the laser light, marks with different reflectivities are formed on the rotating optical disk 501 driven by a motor 502.

Blocks 721 to 726 are for reading data. A high-resolution data signal is input to an equalizer 721 and the signal-to-noise ratio is improved, in particular, for the signal read from marks with length close to the minimum mark length. The signal is then input to a PLL circuit 722 to extract a clock signal. The data signal processed by the equalizer 721 is also input to an A-D converter 723 and is converted into digital data in synchronization with the extracted clock signal. Block 724 is a PRML (Partial Response Maximum Likelihood) signal processing circuit that performs a Viterbi decoding operation. A recorded data decoding circuit 725 decodes the data according to the 1-7PP modulation rule. Final decoded data is output from an error correction circuit 726.

The light component reflected by the half beam splitter 227 shown in FIG. 2 is processed by the control signal generation optical system 228 to generate a tracking error signal and a focus error signal. These signals are fed back to an actuator 111 that controls the position of the objective lens such that the laser light illuminates a point at a correct position on the optical disk.

Third Embodiment

Figure 8:
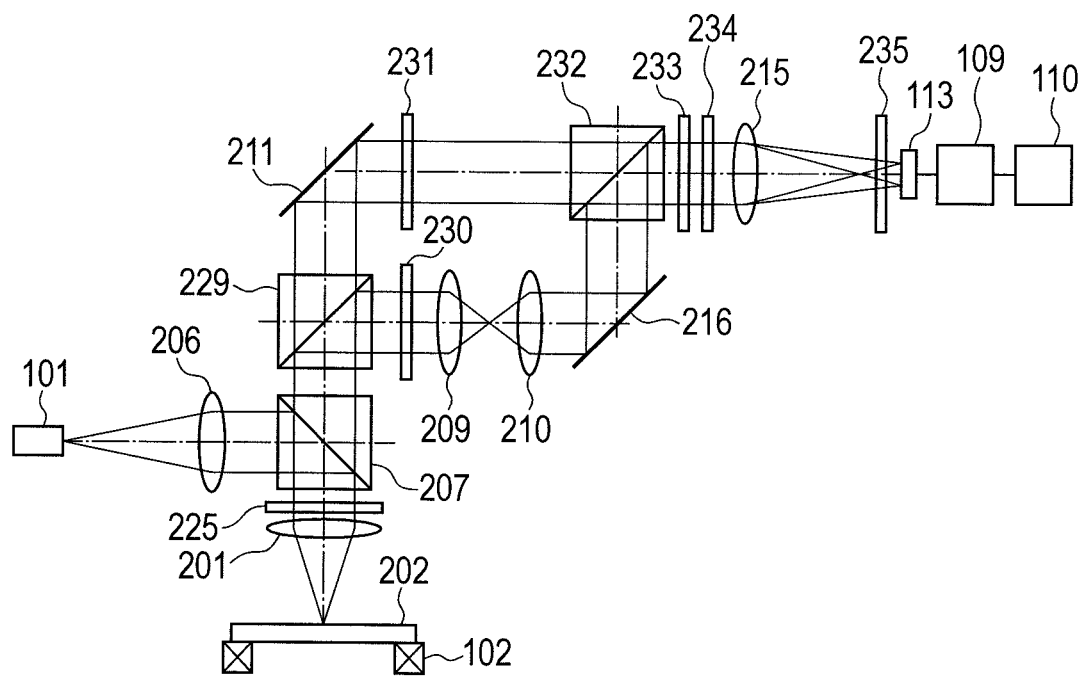
FIG. 8 is a diagram illustrating an example of an optical system according to an embodiment of the present invention.
Figure 9:
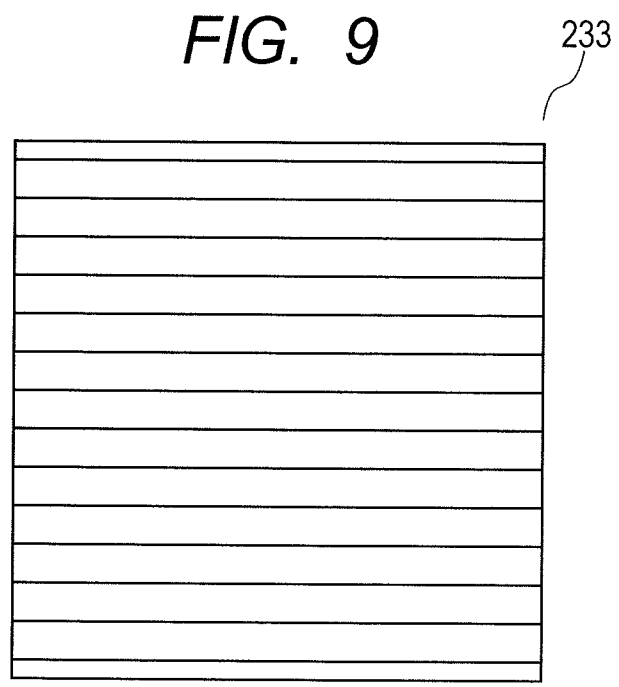
FIG. 9 is a diagram illustrating an example of a non-polarizing diffraction grating.
Figure 10:
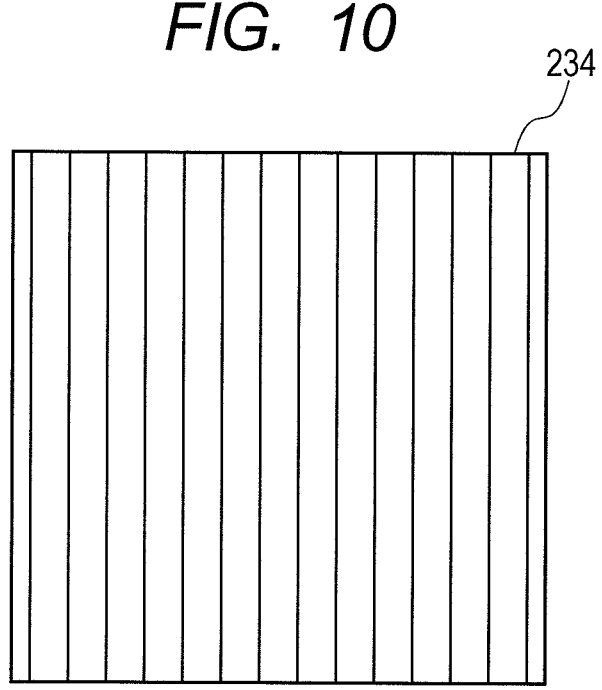
FIG. 10 is a diagram illustrating an example of a non-polarizing diffraction grating.
Figure 11:
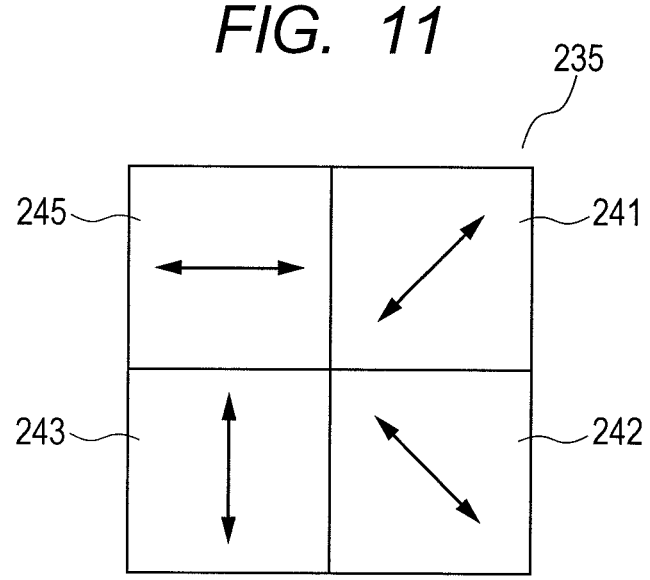
FIG. 11 is a diagram illustrating an example of a four-quadrant integrated linear polarizer and optical axes thereof.
Figure 12:
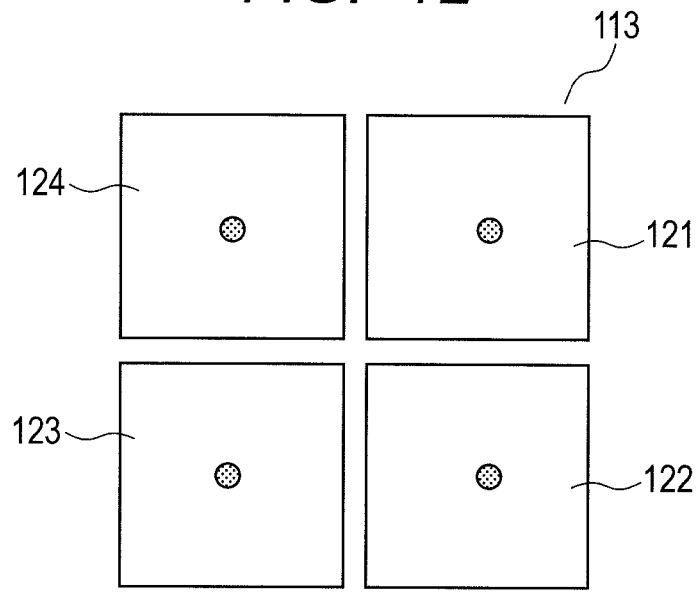
FIG. 12 is a diagram illustrating an example of a four-quadrant integrated detector.

With reference to FIG. 8, a third embodiment of the invention is described below. In this third embodiment, light beams are polarized in a different manner from those used in the first embodiment described above. Optical elements from a laser light source 101 to a half beam splitter 229 are similar to those in the first embodiment. A light beam reflected by a half beam splitter 229 is converted by a quarter wavelength plate 230 into right circular polarized light, and an image inversion is performed by two convex lenses 209 and 210. This reflected light beam is then reflected by a reflecting mirror 216 and is incident on a circular polarizing beam splitter 232. On the other hand, the light beam passing through the half beam splitter 229 is reflected by a reflecting mirror 211 and converted by a quarter wavelength plate 231 into left circuit polarized light. The left circuit polarized light passes through the circular polarizing beam splitter 232 and thus interferes with the right circular polarized light. Light including the right circular polarized component and the left circular polarized component superimposed together passes through non-polarizing diffraction gratings 233 and 234. FIG. 9 and FIG. 10 illustrate manners in which grooves of the non-polarizing diffraction gratings 233 and 234 extend in particular directions. As can be seen, the directions of grooves of the non-polarizing diffraction gratings 233 and 234 are perpendicular to each other, and thus diffractive surfaces of diffracted light of ±1st or higher order are perpendicular to each other. The groove depth of the non-polarizing diffraction gratings 233 and 234 is set such that diffracted light of 0th order is not generated and diffracted light components of ±1st order have equal high intensity. The pitch of the grooves is designed such that resultant light is incident on the detector described below. After passing through the non-polarizing diffraction gratings 233 and 234, the light is split by a condensing lens 215 shown in FIG. 8 into four beams and condensed onto a four-quadrant integrated detector 113. The four beams are generated because each of the two non-polarizing diffraction gratings 233 and 234 has a function of splitting a beam into two beams of ±1st order and these two non-polarizing diffraction gratings 233 and 234 are combined together such that the diffractive surfaces of the two non-polarizing diffraction gratings 233 and 234 are in different directions. A four-quadrant integrated linear polarizer 235 is disposed in front of the detector. The four-quadrant integrated linear polarizer 235 includes linear polarizers 245, 241, 243, and 245 having optical axes in directions of 0°, 45°, 90°, and −45°, respectively. The four split beams are passed through the respective linear polarizers 245, 241, 243, and 245, and detected by the respective four quadrant detectors of the detector 113. FIG. 12 is a top view of the detector 113 including four quadrant detectors 121 to 124. The quadrant detector 124 receives light passing through the quadrant linear polarizer 245. The quadrant detector 121 receives light passing through the quadrant linear polarizer 241. The quadrant detector 123 receives light passing through the quadrant linear polarizer 243. The quadrant detector 122 receives light passing through the quadrant linear polarizer 242. A solid dot in the center of each quadrant detector denotes a spot of focused light beam. When a differential signal output from the quadrant detectors 124 and 123 is denoted by Ic, Ic can be expressed as $Ic = \alpha |A|^2 \cos(\theta)$. When a differential signal output from the quadrant detectors 121 and 122 is denoted by Is, Is can be expressed as $Is = \alpha |A|^2 \sin(\theta)$. Therefore, as in the first embodiment, a high-resolution intensity signal can be obtained by calculating $I = \sqrt{(Ic^2 + Is^2)} = \alpha |A|^2$ by using the electronic circuit 109. The display apparatus 110 displays an image according to the obtained high-resolution intensity signal.

Fourth Embodiment

The optical systems disclosed in the embodiments described above do not have resolving power in a direction of the optical axis. More specifically, for example, in a case where a reflecting mirror is placed as an object under observation, when the reflecting mirror is moved along the optical axis, no change occurs in the output signal of the detector unless a change in light intensity occurs due to a change in the amount of light blocked by an edge of an aperture or unless a change occurs in the amount of light received by the detector due to a change in the amount of a light beam component extending outward beyond the edge of the detector. This is because the two interfering light beams respond in a similar manner to the movement of the reflecting mirror along the optical axis, and thus the movement of the reflecting mirror does not cause a change to occur in the output signal generated by detecting the interference.

Figure 13:
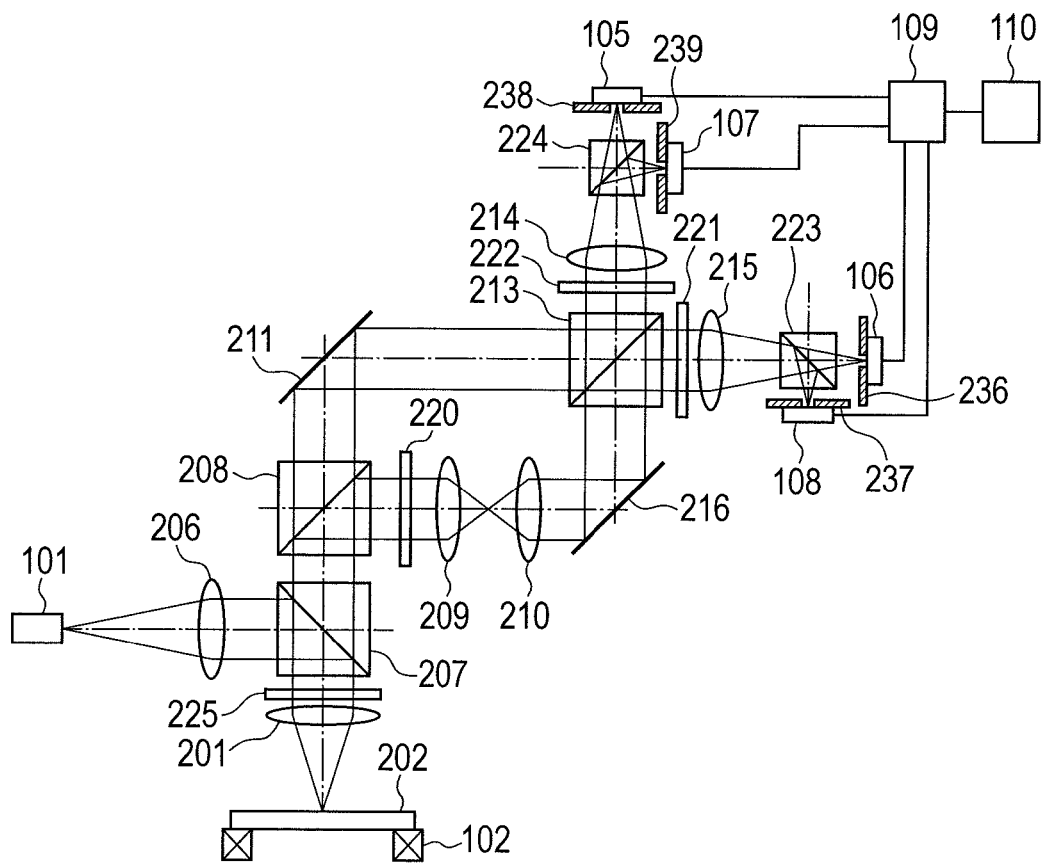
FIG. 13 is a diagram illustrating an example of an optical system including a pinhole disposed in front of a detector according to an embodiment of the present invention.

In a fourth embodiment, to achieve resolving power in the direction along the optical axis, the detection areas of the respective photodetectors 105, 106, 107, and 108 are limited by pinholes 238, 236, 239, and 237 as shown in FIG. 13. The size of each pinhole may be set to be nearly equal to the size of an Airy disk in a state in which each beam is focused using a condensing lens. In this structure, when the reflecting mirror moves off the focal position along the optical axis, the presence of the pinhole allows only a part of the expanded beam to be detected, which results in a reduction in the intensity of light detected, and thus resolving power in the direction along the optical axis is obtained. If the size of each pinhole is set to be too small, the optical characteristic becomes similar to that of a confocal scanning microscope, and thus the advantage of the high resolution and the high detected light intensity provided by embodiments of the invention can be lost.

In the present embodiment, the pinholes are added to the optical system according to the first embodiment described above with reference to FIG. 1. Note that the technique according to the present embodiment may be applied to other optical systems such as that according to the second or the third embodiment.

Fifth Embodiment

Figure 14:
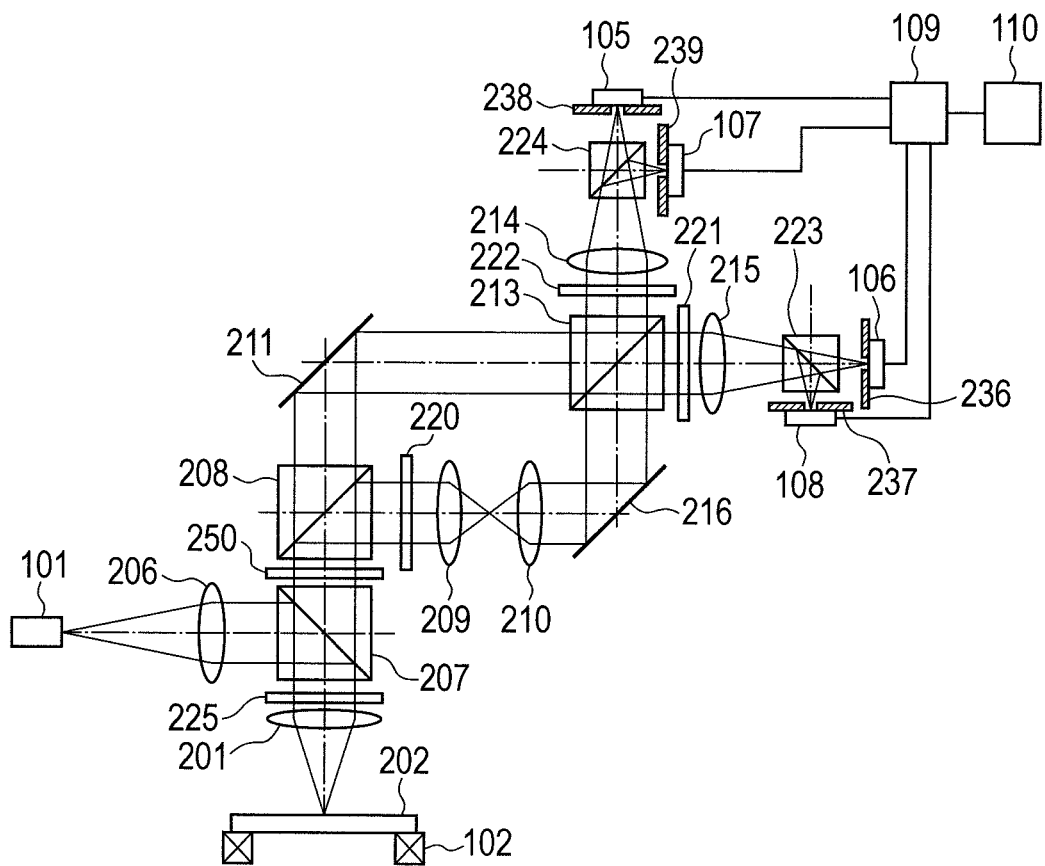
FIG. 14 is a diagram illustrating an example of an optical system in which both a light blocking plate and a pinhole are used, according to an embodiment of the present invention.
Figure 15:
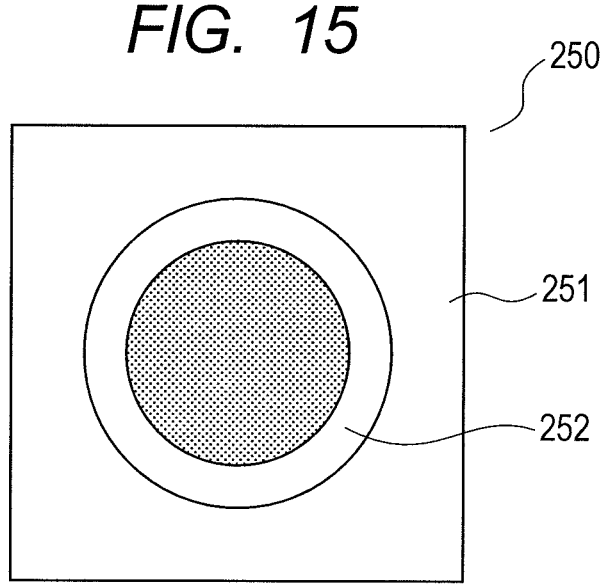
FIG. 15 is a diagram illustrating an example of a shape of a light blocking plate.

With reference to FIG. 14, a third embodiment of the invention is described below. In this embodiment, a light blocking plate is disposed in an optical path to further improve resolving power. In the present embodiment, a light blocking plate 250 is inserted in the optical system with the additional pinhole according to the fourth embodiment. The light blocking plate 250 is disposed immediately in front of the beam splitter 208 that splits the reflected light from object under observation into two beams for interference. FIG. 15 illustrates an example of a shape of the light blocking plate 250. In FIG. 15, reference numeral 251 denotes a beam shape of reflected light from the object under observation. The central portion of the beam is blocked by a blocking area 252 such that only a peripheral part of the light beam can contribute to the interference. As a result, a further improvement in resolving power is achieved. By increasing the radius of the blocking area, it is possible to improve the resolving power. However, a reduction in detected light intensity occurs, which results in a reduction in the signal-to-noise ratio. In the present embodiment, it is preferable to limit the diameter of the blocking area to 80% of the beam diameter. Even when this limitation is imposed, it is possible to achieve an improvement in resolving power. The blocking area shown in FIG. 15 may be produced, for example, by evaporating chromium on a glass plate via a mask with a circular window.

The light blocking plate may be located in the optical path emerging from the beam splitter 213 shown in FIG. 14. In this case, for example, the light blocking plate may be disposed immediately in front of the half wavelength plate 221 and the quarter wavelength plate 222. Although in the present embodiment, both the pinhole and the light blocking plate are disposed, only the light blocking plate may be disposed to achieve an improvement in resolving power in the lateral direction.

Still alternatively, the light blocking plate may be disposed in an optical path of light illuminating an object under observation. In this case, the light blocking plate may be disposed immediately at the back of the collimator lens 206.

Still alternatively, two light blocking plates may be disposed such that one is located in an optical path of light illuminating an object under observation and the other is located in an optical path of the reflected light from the object under observation. In this case, the light blocking plates may be disposed between the beam splitter 207 and the objective lens 201.

Sixth Embodiment

Figure 16:
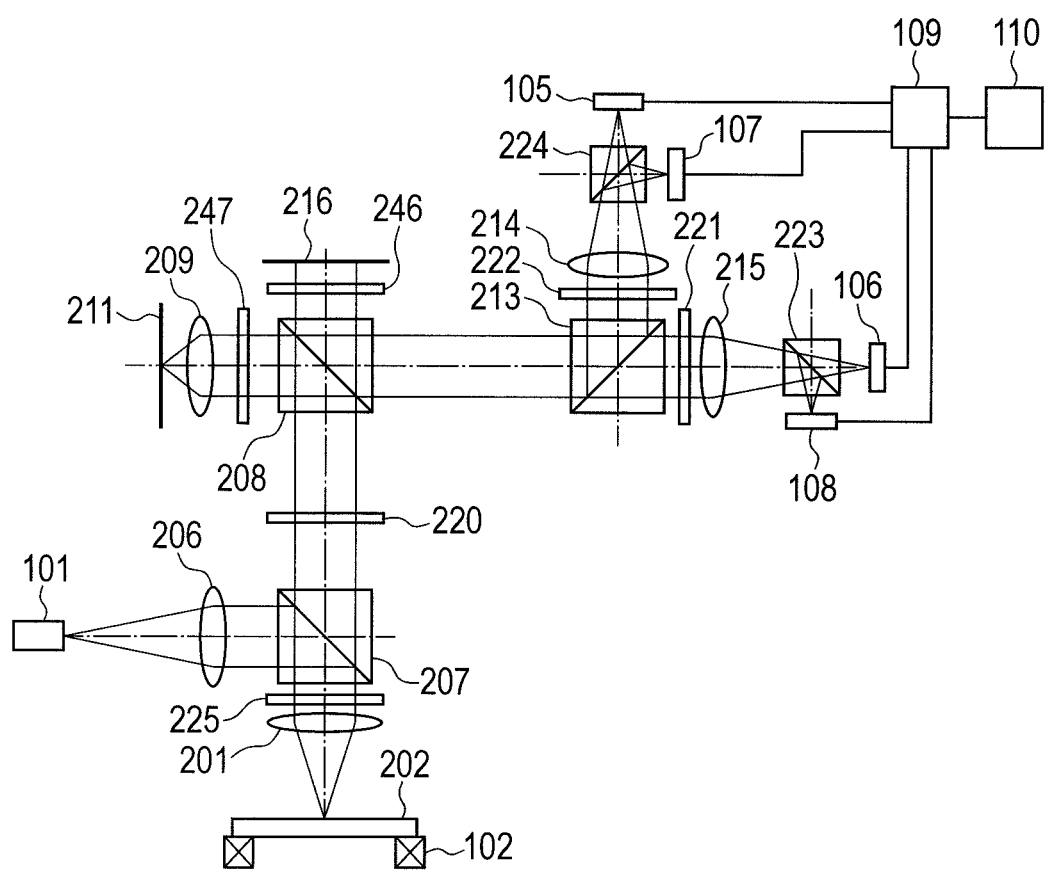
FIG. 16 is a diagram illustrating an example of an optical system according to an embodiment of the present invention.

With reference to FIG. 16, a sixth embodiment of the present invention is described below. In this sixth embodiment, the two convex lenses 209 and 210 used in the first embodiment to achieve the image inversion are replaced by one convex lens to simplify the optical system. From the collimation of a light beam emitted from a laser light source 101 until reflected light from an object under observation 202 passes through a polarizing beam splitter 207, the process in this embodiment is performed in a similar manner to the first embodiment. After passing through the polarizing beam splitter 207, p-polarized light is converted by a half wavelength plate 220 into light linearly polarized in a 45° direction. This light beams is split into two light beams by a polarizing beam splitter 208 such that p-polarized light passes through the polarizing beam splitter 208 while s-polarized light is reflected by the polarizing beam splitter 208. The transmitted light beam is converted into a circular polarized beam by a quarter wavelength plate 246 and reflected by a reflecting mirror 216. After passing through the quarter wavelength plate 246, the light beam is converted into s-polarized light and returns to the polarizing beam splitter 208. On the other hand, the s-polarized light beam reflected by the polarizing beam splitter 208 is converted into circular polarized via a quarter wavelength plate 247 and illuminates, via a convex lens 209, a reflecting mirror 211 located in a focal plane of the convex lens 209. The light reflected by the reflecting mirror 211 returns to the convex lens 209 and converted into p-polarized light by the quarter wavelength plate 247. This light, unlike the light reflected by the reflecting mirror 216, is in the image-inverted state. The light transmitted through the quarter wavelength plate 246 is in the s-polarized state, while the light transmitted through the quarter wavelength plate 247 is in the p-polarized state. These two light beams are superimposed together via the polarizing beam splitter 208 and travel toward a beam splitter 213. The light beam is split into two beams by the beam splitter 213, and each beam is passed through a wave plate and a condensing lens. Thereafter, each beam is split into two beams by a polarizing beam splitter. Thereafter, signals are output from four detectors and a high-resolution image of the object under observation is displayed on a display apparatus 110 according to the signals in a similar manner to the first embodiment described above.

Seventh Embodiment

Figure 17:
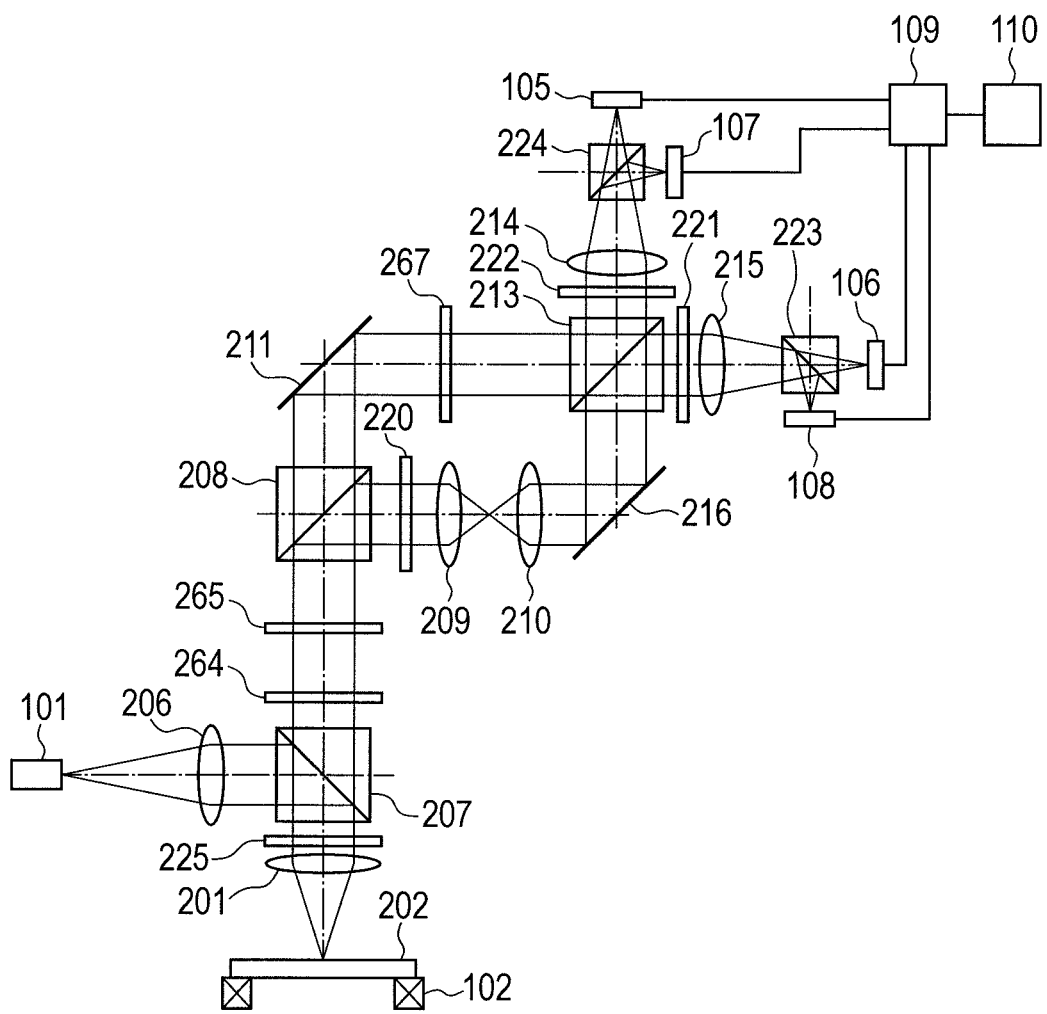
FIG. 17 is a diagram illustrating an example of an optical system for use in detecting fluorescence according to an embodiment of the present invention.

In a case where an object under observation illuminated with light emits fluorescence, it is possible to observe the object using a fluorescence image. However, even when exciting illumination light is in a state in which it is polarized in a particular single direction, generated fluorescence light is randomly polarized. To achieve a high resolution, it is necessary to select a particular polarized state and split the light in the selected state into two beams for interference. Thus, in view of the above, in a seventh embodiment described below with reference to FIG. 17, a shortcut filter 264, a polarizer 265, and a phase retarder 267 are added to the optical system according to the first embodiment described above such that fluorescence light in the s-polarized state is extracted via the polarizer 265 and only this extracted light is used. Laser light emitted from a laser light source 101 illuminates an object 202 under observation. The laser light illuminating the object 202 under observation excites it to emit fluorescence light. When light passes through the shortcut filter 264, the exciting light component is blocked, and only the fluorescence light component with a wavelength greater than that of the exciting light component travels to the polarizer 265. The polarizer 265 allows only s-polarized fluorescence light to reach the beam splitter 208. The beam splitter 208 splits the fluorescence light into two beams. Of the two beams, a reflected beam travels to a half wavelength plate 220 and is converted into p-polarized light. Thereafter, the image is inverted by convex lenses 209 and 210 and the resultant beam travels to a beam splitter 213. On the other hand, the fluorescence light passed through the beam splitter 208 is passed through the phase retarder 267, and then the fluorescence light travels to the beam splitter 213. The two light beams incident on the beam splitter 213 are then detected by four detectors, and an image is displayed on a display apparatus 110 according to the signal output from the detectors.

Figure 18:
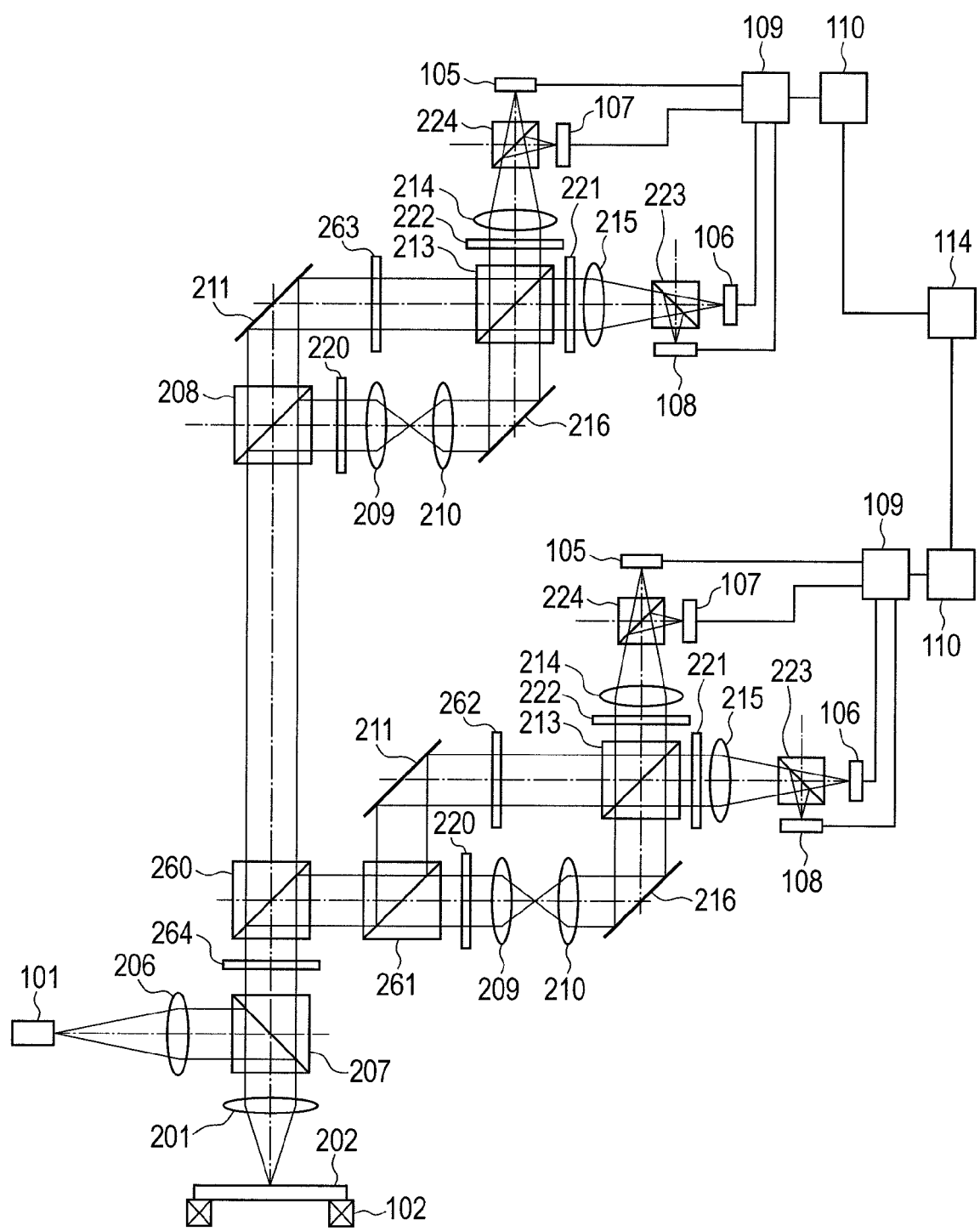
FIG. 18 is a diagram illustrating an example of an optical system for use in detecting fluorescence according to an embodiment of the present invention.

FIG. 18 illustrates an example in which after fluorescence light from an object under observation is split into two beams polarized in directions perpendicular to each other, an interfering process is performed. It is necessary to perform the same optical processing on the respective split fluorescence light beams, and thus two similar optical systems are disposed.

In FIG. 18, light emitted from a laser light source such as a semiconductor laser 101 is reflected by a beam splitter 207 and illuminates the object under observation. As a result, the object under observation is excited and generates fluorescence light. The generated fluorescence light passes through the beam splitter 207 and the exciting light component is removed by a shortcut filter 264. A polarizing beam splitter 260 splits the fluorescence light incident thereon into p-polarized light that passes through polarizing beam splitter 260 and s-polarized light that is reflected by the polarizing beam splitter 260. Each beam is then further split into two beams by a beam splitter 261 or 208 and the resultant beams interfere with each other. In the interfering process for fluorescence light beams with small coherence length, it is required to achieve an equal optical path difference. This requirement can be met by using phase retarders 263 and 262. An image of each polarization direction may be displayed on a corresponding display apparatus 110. Images of the two polarization directions may be added or may be subjected to other processing, and a result may be displayed on a display apparatus 114.

In the embodiment described above with reference to FIG. 18, fluorescence light is split by the beam splitter 260 into two linear polarized beams. Alternatively, the fluorescence light may be split into two circular polarized beams. In this case, optical systems each similar to the interfering optical system according to the third embodiment described above with reference to FIG. 8 may be used to process the respective two circular polarized beams. Note that also in this case, the phase retarders are necessary to handle fluorescence light with small coherence length.

The above-described embodiments of the invention may be applied to an apparatus designed to acquire a high-resolution image. More specifically, for example, the embodiments of the invention may be applied to an optical pickup for reading a high-density optical disk.

What is claimed is:

1. An optical apparatus comprising:
a light source;
a condensing optical system configured to condense light emitted from the light source onto an object;
a splitting optical system configured to split response light detected from the object into two beams of light;
a polarizing optical element configured to polarize the two split beams of response light into different polarization states;
an image-inverting optical system disposed in one of optical paths of the two split beams of response light;
an element configured to superimpose response light image-inverted by the image-inverting optical system with the other response light thereby generating combined response light;
an optical element configured to split the combined response light into a plurality of beams;
different polarizing filters disposed in optical paths of the respective split beams of combined response light;
detectors configured to detect the respective split beams of combined response light; and
a circuit configured to calculate amplitude information and/or phase information by processing signals supplied from the respective detectors.

2. The optical apparatus according to claim 1, wherein the different polarization states of the two split beams of response light are s-polarized light and p-polarized light.

3. The optical apparatus according to claim 1, wherein the different polarization states of the two split beams of response light are a right circular polarized state and a left circular polarized state.

4. The optical apparatus according to claim 1, further comprising a pinhole with a size nearly equal to the size of an Airy disk of a focused light spot occurring in front of the detector.

5. The optical apparatus according to claim 1, further comprising a light blocking plate disposed in an optical path of the response light such that a central part thereof is blocked.

6. The optical apparatus according to claim 1, wherein the light source has a coherence length approximately equal to or greater than 5 mm.

7. The optical apparatus according to claim 1, wherein the image-inverting optical system includes one lens and a reflecting mirror.

8. The optical apparatus according to claim 1, wherein the response light is fluorescence,
and wherein the optical apparatus further comprises a polarizer disposed in an optical path of the response light thereby to select a particular polarization state.

9. The optical apparatus according to claim 1, wherein the response light is fluorescence light,
wherein the optical apparatus further comprises a means for splitting the fluorescence light from the object into beams polarized into directions perpendicular to each other, and
wherein at least the splitting optical system, the polarizing optical element, the image-inverting optical system, the element configured to generate the combined light, the optical element configured to split the combined light, the polarizing filter, and the detector are provided for each of the polarized beams.

10. An optical apparatus comprising:
a light source;
a condensing optical system configured to condense light emitted from the light source onto an object under observation;
a splitting optical system configured to split response light from the object under observation into two beams of light;
a polarizing optical element configured to polarize the two split beams of response light into different polarization states;
an image-inverting optical system disposed in one of optical paths of the two split beams of response light;
an element configured to superimpose response light image-inverted by the image-inverting optical system with the other response light thereby generating combined response light;
an optical element configured to split the combined response light into a plurality of beams;
different polarizing filters disposed in optical paths of the respective split beams of combined response light;
detectors configured to detect the respective split beams of combined response light;
a circuit configured to calculate amplitude information and/or phase information by processing signals supplied from the respective detectors; and a display apparatus configured to display an output from the circuit.

* * * * *